(12) United States Patent
Fines

(10) Patent No.: US 12,337,629 B2
(45) Date of Patent: Jun. 24, 2025

(54) HITCH APPARATUS AND METHOD

(71) Applicant: Casey Fines, West Fargo, ND (US)

(72) Inventor: Casey Fines, West Fargo, ND (US)

( * ) Notice: Subject to any disclaimer, the term of this patent is extended or adjusted under 35 U.S.C. 154(b) by 574 days.

(21) Appl. No.: 17/861,452

(22) Filed: Jul. 11, 2022

(65) Prior Publication Data

US 2024/0010037 A1   Jan. 11, 2024

(51) Int. Cl.
*B60D 1/40* (2006.01)
*B60D 1/46* (2006.01)

(52) U.S. Cl.
CPC ................. *B60D 1/40* (2013.01); *B60D 1/46* (2013.01)

(58) Field of Classification Search
CPC .................................... B60D 1/40; B60D 1/46
See application file for complete search history.

(56) References Cited

U.S. PATENT DOCUMENTS

| | | | | |
|---|---|---|---|---|
| 6,974,146 B2* | 12/2005 | Abair | ...... | B60D 1/36 |
| | | | | 280/491.2 |
| 11,752,815 B2* | 9/2023 | McAllister | ...... | B60D 1/465 |
| | | | | 177/136 |
| 12,083,839 B2* | 9/2024 | Smith | ...... | B60D 1/62 |
| 2006/0163841 A1* | 7/2006 | Krstovic | ...... | B60D 1/40 |
| | | | | 280/478.1 |
| 2024/0208285 A1* | 6/2024 | Fines | ...... | B60D 1/46 |
| 2025/0083481 A1* | 3/2025 | Cannon | ...... | B60D 1/46 |

* cited by examiner

*Primary Examiner* — Kevin Hurley
(74) *Attorney, Agent, or Firm* — Darryl Edwin Scott

(57) ABSTRACT

An apparatus having a hitch arm having a cross beam. The cross beam has a first end and a second end. A first hitch member is adjacently coupled to the first end. A second hitch member is adjacently coupled to the second end. A hitch receiver is coupled to the cross beam. A first hitch frame is rotatably coupled to the first hitch member A second hitch frame is rotatably coupled to the second hitch member. A first extender is coupled to the first hitch frame and the first hitch member. A second extender is coupled to the second hitch frame and the second hitch member.

14 Claims, 5 Drawing Sheets

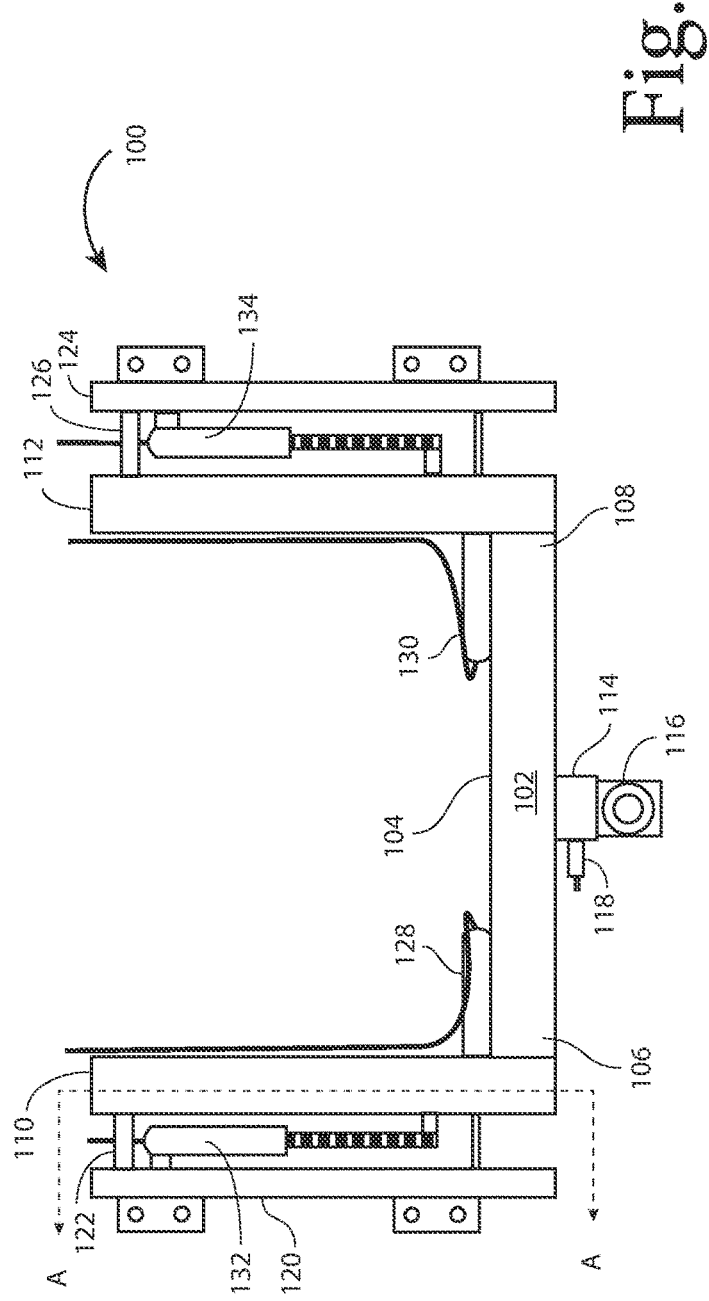
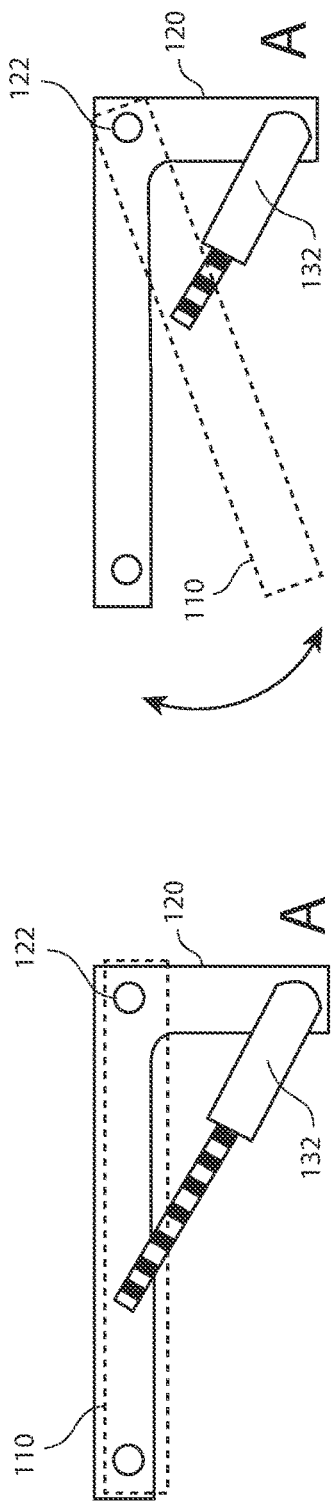
Fig. 2
Fig. 3
Fig. 4

HITCH APPARATUS AND METHOD

BACKGROUND

Coupling a trailer hitch to a trailer requires an individual to meticulously align a trailer ball to a trailer coupler. Aligning and coupling these two objects together require the trailer ball to be horizontally and vertically aligned such that the trailer coupler can be lowered onto the trailer ball. For example, the trailer may need to be ratcheted vertically above the trailer ball and then subsequently ratcheted down onto the trailer ball. This method is cumbersome, especially if the trailer is loaded with heavy material. Once the trailer is ratcheted into the correct height, the vehicle having the trailer hitch must be reversed in line with the trailer coupler. In most cases, this requires two individuals to aid in aligning the trailer ball to the trailer coupling. In addition, these steps may be performed during extreme environmental conditions, such as extreme heat, extreme cold, or during storms which adds additional challenges when trying to quickly couple a trailer hitch to a trailer. Coupling a trailer hitch to a trailer coupler is a challenge.

BRIEF DESCRIPTION OF THE DRAWINGS

FIG. 2 is an aerial view of a hitch apparatus.

FIG. 3 is a cross-sectional view of FIG. 2 displaying a hitch arm, a hitch frame, and an extender in an engaged position.

FIG. 4 is a cross-sectional view of FIG. 2 displaying the hitch arm, the hitch frame, and the extender in a disengaged position.

DETAILED DESCRIPTION

The following detailed description illustrates embodiments of the present disclosure. These embodiments are described in sufficient detail to enable a person of ordinary skill in the art to practice these embodiments without undue experimentation. It should be understood, however, that the embodiments and examples described herein are given by way of illustration only, and not by way of limitation. Various substitutions, modifications, additions, and rearrangements may be made that remain potential applications of the disclosed techniques. Therefore, the description that follows is not to be taken as limiting on the scope of the appended claims. In particular, an element associated with a particular embodiment should not be limited to association with that particular embodiment but should be assumed to be capable of association with any embodiment discussed herein.

Coupling a trailer hitch to a trailer requires an individual to meticulously align a trailer ball to a trailer coupler. Executing this connection requires numerous steps that may require two or more individuals to accomplish. The goal is to maneuver the trailer ball into the correct horizontal and vertical position such that the trailer coupler can be lowered onto the trailer ball. First, the trailer may need to be ratcheted vertically above the trailer ball. This may be cumbersome, especially if the trailer has a heavy load. Next, a vehicle having the trailer hitch is reversed towards the trailer coupler to begin the coupling process. Once the trailer hitch is aligned with the trailer coupler, the trailer is ratcheted down such that the trailer coupler is lowered onto the trailer ball. Additional steps may include connecting the trailer wiring harness and safety chains. Further, these steps may be performed during extreme environmental conditions, such as extreme heat, extreme cold, or during storms which adds additional challenges when trying to quickly couple a trailer hitch to a trailer coupler.

The embodiments described herein provides an apparatus that allows a trailer ball to be mechanically coupled to a trailer coupler without the need to ratchet the trailer in the correct vertical position. Specifically, the embodiments describe an automated hitch apparatus. With the aid of rear-view camera systems now required in all modern vehicles in the United States, positioning the hitch apparatus to a trailer coupler reduce the need for the individual to spend a lot of time in the elements to manually connect the trailer hitch and trailer. With the use of the hitch apparatus, the individual will only need to leave their vehicle to lock the trailer coupler handle, secure the trailer wiring harness, and connect the safety chains.

Figure 1:
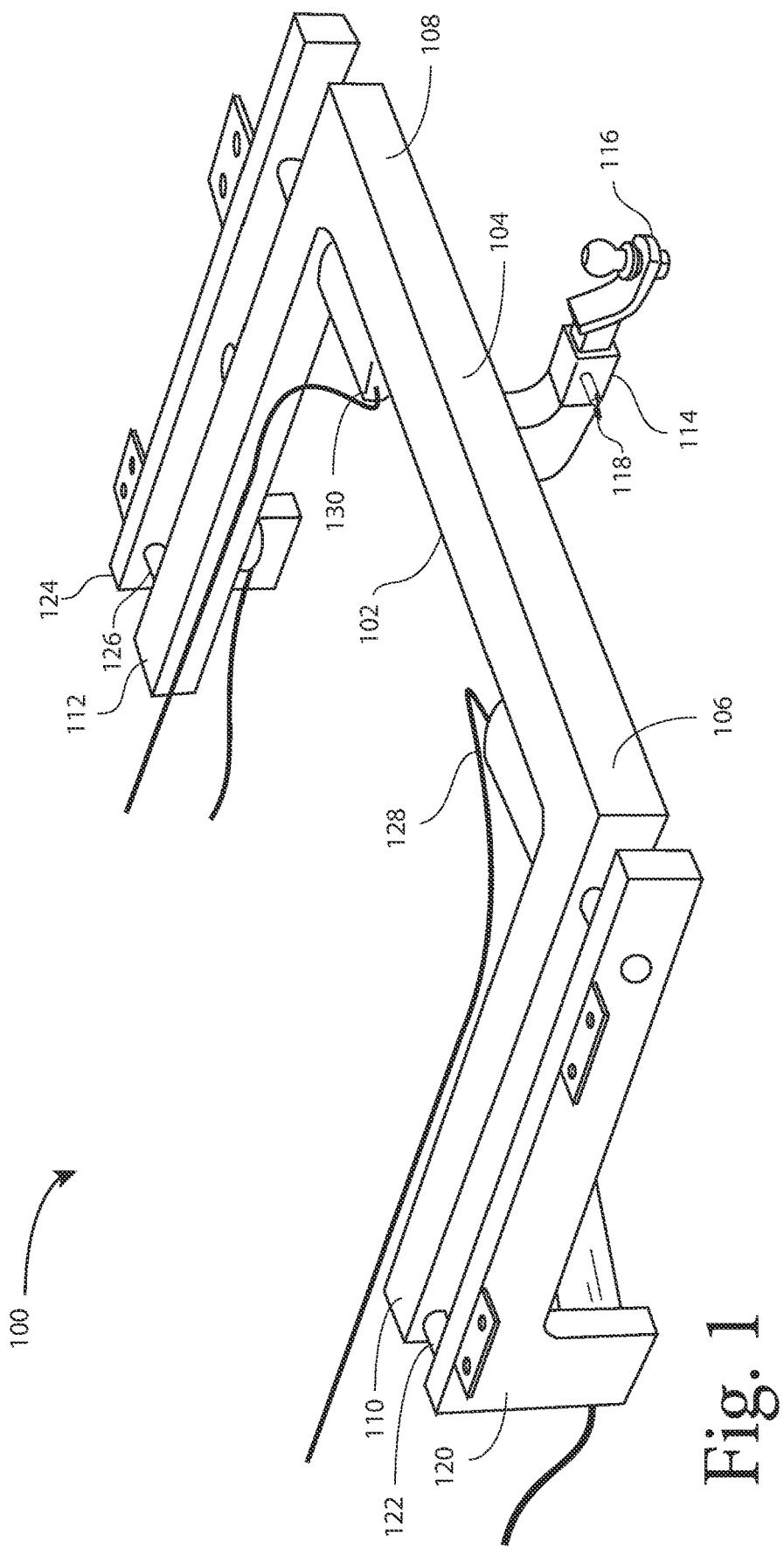
FIG. 1 is a perspective view of a hitch apparatus.

FIG. 1 is a perspective view of a hitch apparatus. FIG. 2 is an aerial view of a hitch apparatus. As illustrated in FIGS. 1 and 2, a hitch apparatus 100 may include a hitch arm 102. The hitch arm 102 may form a U-shape that aligns with the frame of a vehicle's end (i.e., trunk section, tail gate section). The hitch arm 102 may be manufactured from a metal alloy. In one or more embodiments, the hitch arm 102 may be hollow to reduce the weight of the hitch arm 102. In another embodiment, the hitch arm 102 may be solid (i.e., not hollow) to increase the tensile strength of the hitch arm 102. The density and dimensions of the hitch arm 102 may vary depending on application.

The hitch arm 102 may include a cross beam 104. The cross beam 104 may form an elongated cube having a first end 106 and a second end 108 opposite the first end 106. The cross beam 104 is the section of the hitch apparatus 100 that runs parallel with the rear bumper of a vehicle. In one or more embodiments, the hitch arm 102 includes a first hitch member 110 adjacently coupled to the first end 106. Specifically, the first hitch member 110 may be coupled substantially perpendicular (i.e., within one, five, or ten degrees) with the first end 106 of the cross beam 104. The first hitch member 110 may be coupled to the first end 106 by welding or by bolting. In another embodiment, the first hitch member 110 may be integrally coupled to the first end 106.

In one or more embodiments, the hitch arm 102 includes a second hitch member 112 adjacently coupled to the second end 108. Specifically, the second hitch member 112 may be coupled substantially perpendicular (i.e., within one, five, or ten degrees) with the second end 108 of the cross beam 104. The second hitch member 112 may be coupled to the second end 108 by welding or by bolting. In another embodiment, the second hitch member 112 may be integrally coupled to the second end 108.

As further illustrated in FIGS. 1 and 2, the cross beam 104 may include a hitch receiver 114. The hitch receiver 114 is positioned along a center axis of the cross beam 104. The hitch receiver 114 may be integrally coupled to the cross beam 104. In another embodiment, the hitch receiver 114 may be coupled to the cross beam 104 by welding or bolting. The hitch receiver 114 may form the shape and configuration of a standard hitch receiver coupled to a standard trailer hitch. That is, the hitch receiver 114 forms the shape of a hollow cube that allows a standard ball mount to be inserted and coupled into the hitch receiver 114. The hitch receiver 114 may be manufactured in varying dimensions dependent on application.

In one or more embodiments, the hitch receiver 114 includes a ball mount 116. The ball mount 116 comprises a shank and a trailer ball platform that is couplable to a trailer coupler. The ball mount 116 may be manufactured in varying sizes depending on application. The ball mount 116 may be inserted into the hitch receiver 114 and secured by a hitch pin 118.

As further illustrated in FIGS. 1 and 2, the hitch apparatus 100 may include a first hitch frame 120 rotatably coupled to the first hitch member 110. The first hitch frame 120 may form an L-shape, such that one portion of the first hitch frame 120 is longer in length as compared to the second portion of the first hitch frame 120. In addition, the first portion of the first hitch frame 120 is perpendicularly coupled to the second portion of the first hitch frame 120. The axis-point in which the two portions of the first hitch frame 120 meet is the section in which the first hitch frame 120 is coupled to the first hitch member 110. The first hitch frame 120 is coupled to the axis-point of the first hitch member 110 by a first pin 122, which also creates separation between the first hitch frame 120 and the first hitch member 110. In addition, the first hitch frame 120 is the portion of the hitch apparatus 100 that is coupled to a vehicle frame.

In one or more embodiments, as illustrated in FIGS. 1 and 2, the hitch apparatus 100 may include a second hitch frame 124 rotatably coupled to the second hitch member 112. The second hitch frame 124 may form an L-shape, such that one portion of the second hitch frame 124 is longer in length as compared to the second portion of the second hitch frame 124. In addition, the first portion of the second hitch frame 124 is perpendicularly coupled to the second portion of the second hitch frame 124. The axis-point in which the two portions of the second hitch frame 124 meet is the section in which the second hitch frame 124 is coupled to the second hitch member 112. The second hitch frame 124 is coupled to the axis-point of the second hitch member 112 by a second pin 126, which creates separation between the second hitch frame 124 and the second hitch member 112. In addition, the second hitch frame 124 is the portion of the hitch apparatus 100 that is coupled to a vehicle frame.

As illustrated in FIGS. 1 and 2, the hitch apparatus may include locking actuators. Specifically, the first hitch member 110 is couplable to the first hitch frame 120 by a first locking actuator 128. In addition, the second hitch member 112 is couplable to the second hitch frame 124 by a second locking actuator 130. When the hitch apparatus 100 is in an engaged position (as illustrated in FIG. 1) an individual may engage the actuators electronically through a key fob, downloadable software, or manually to secure the hitch arm 102 to the first hitch frame 120 and second hitch frame 124.

As illustrated in FIG. 2, the hitch arm 102 is engaged and disengaged by extenders. The extenders are the mechanism that controls the rotation of the hitch arm 102 about an axis-point (i.e., the first pin 122 and the second pin 126). Specifically, a first extender 132 is coupled to the first hitch frame 120 and the first hitch member 110; and a second extender 134 is coupled to the second hitch frame 124 and the second hitch member 112. As illustrated in FIG. 2, the housing portion of the extenders (i.e., first extender 132, second extender 134) is coupled to the shorter portion of the hitch frames (i.e., first hitch frame 120, second hitch frame 124) and the rod portion is coupled to the hitch member (i.e., first hitch member 110, second hitch member 112).

FIG. 3 is a cross-sectional view of FIG. 2 displaying a hitch arm, a hitch frame, and an extender in an engaged position. FIG. 4 is a cross-sectional view of FIG. 2 displaying the hitch arm, the hitch frame, and the extender in a disengaged position. As illustrated in FIG. 3, and as described above, when engaged the rod portion of the extenders (i.e., first extender 132, second extender 134) forces the hitch arm 102 to rotate about the axis-point (i.e., first pin 122, second pin 126) to a parallel position with the hitch frames (i.e., first hitch frame 120, second hitch frame 124). Once in a parallel position, the hitch apparatus 100 is ready to be locked by the locking actuators (i.e., first locking actuator 128, second locking actuator 130) and to be secured and coupled to a trailer coupler.

Conversely, as illustrated in FIG. 4, when disengaged, the rod portion of the extenders (i.e., first extender 132, second extender 134) pulls the hitch arm 102, thus forcing the hitch arm 102 to rotate about the axis point (i.e., first pin 122, second pin 126) to a degree of between one and forty-five degrees from the hitch frames (i.e., first hitch frame 120, second hitch frame 124).

In one or more embodiments, the first extender 132 and second extender 134 are comprised of a pneumatic system. The pneumatic system may include a pneumatic cylinder, intake filter, compressor, separator, receiver tank, and control valve for example. The pneumatic system may be controlled remotely by a computer that is accessed by an individual through a key fob, downloadable mobile app, electronic switch or button placed inside or outside the vehicle.

In one or more embodiments, the first extender 132 and second extender 134 are comprised of a hydraulic system. The hydraulic system may include a hydraulic actuator, a hydraulic pump, valves motor, reservoir, pipelines, filters, pressure regulator, accumulators, and a hydraulic power pack for example. The hydraulic system may be controlled remotely by a computer that is accessed by an individual through a key fob, downloadable mobile app, electronic switch or button placed inside or outside the vehicle.

In one or more embodiments, the first extender 132 and second extender 134 are comprised of a push-rod system. The push-rod system may include a twelve-volt direct current motor and a threaded shaft. The push-rod system may be controlled remotely by a computer that is accessed by an individual through a key fob, downloadable mobile app, electronic switch or button placed inside or outside the vehicle.

Figure 5:
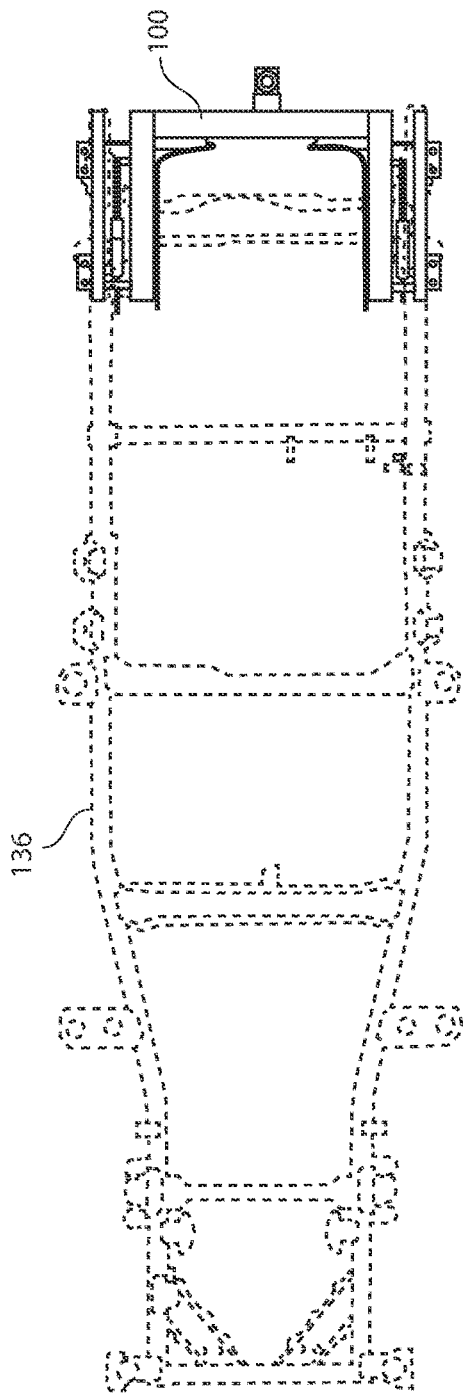
FIG. 5 is an aerial view of a hitch apparatus coupled to a vehicle frame.
Figure 6:
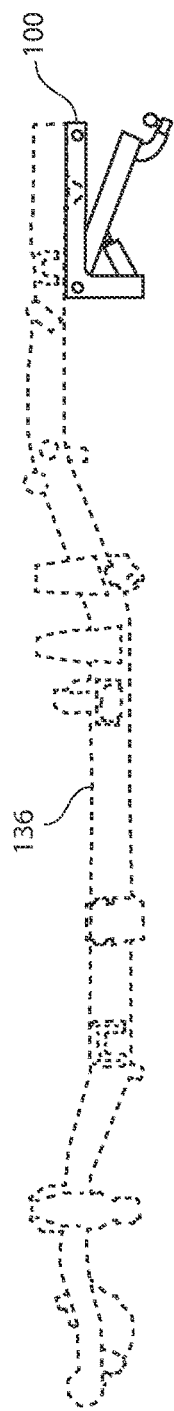
FIG. 6 is a profile view of a hitch apparatus coupled to a vehicle frame.

FIG. 5 is an aerial view of a hitch apparatus coupled to a vehicle frame. FIG. 6 is a profile view of a hitch apparatus coupled to a vehicle frame. As illustrated in FIGS. 5 and 6 the hitch apparatus 100 is coupled to a vehicle frame 136. Specifically, the hitch apparatus 100 is coupled to the rear portion of the vehicle frame 136 by its hitch frames (i.e., first hitch frame 120 and second hitch frame 124) using bolts or by welding.

Figure 7:
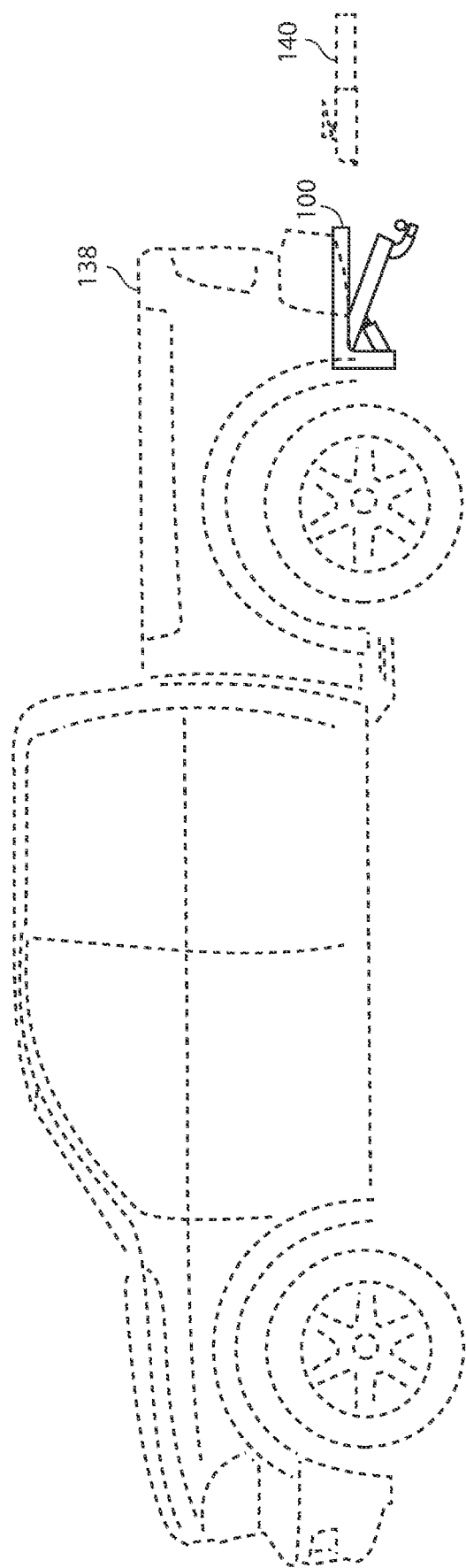
FIG. 7. is a profile view of a hitch apparatus coupled to a frame of a vehicle and a trailer coupler.

FIG. 7. is a profile view of a hitch apparatus coupled to a frame of a vehicle and a trailer coupler. As illustrated in FIG. 7, the hitch apparatus 100 is coupled to a vehicle frame 136 (not illustrated in FIG. 7 for clarity) which is coupled to a vehicle 138. Although FIG. 7 schematically illustrates a truck, the hitch apparatus 100 may be coupled to various mobile vehicles such as a car, a van, a sports utility vehicle, a four-wheeler, etc. The hitch apparatus 100 may be manufactured in various dimension to complement its application. Here, in FIG. 7, the hitch apparatus 100 is illustrated in the disengaged position, which allows an individual to reverse the vehicle to align with a trailer coupler 140.

Figure 8:
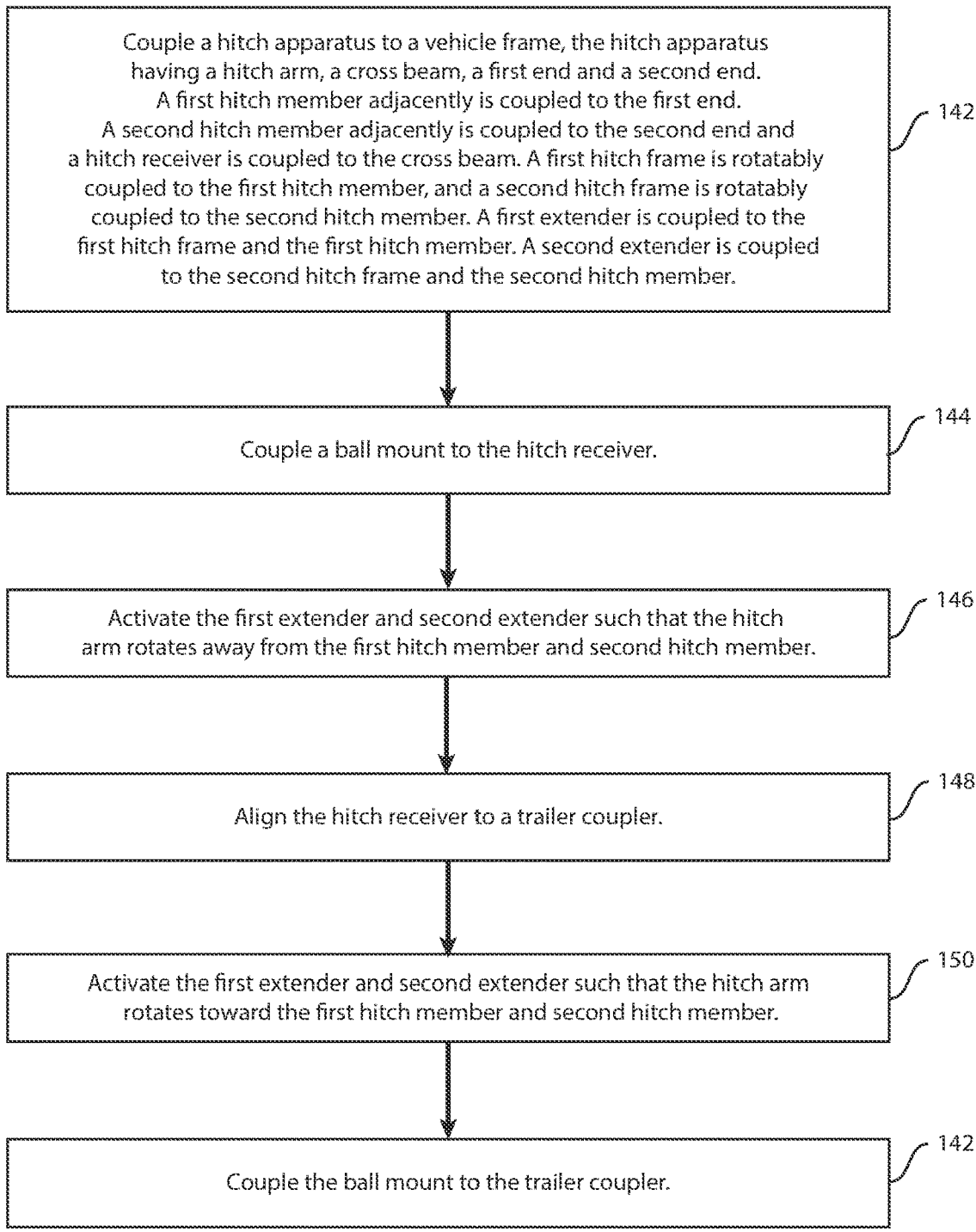
FIG. 8 is a flow chart illustrating the method of coupling a hitch apparatus to a trailer coupler.

FIG. 8 is a flow chart illustrating the method of coupling a hitch apparatus to a trailer coupler. In operation, a hitch apparatus (such as hitch apparatus 100) is coupled to a vehicle frame (such as vehicle frame 136), the hitch apparatus (such as hitch apparatus 100) having a hitch arm (such as hitch arm 102), a cross beam (such as cross beam 104), a first end (such as first end 106) and a second end 108). A first hitch member (such as first hitch member 110) is adjacently coupled to the first end (such as first end 106). A second hitch member (such as second hitch member 112) is adjacently coupled to the second end (such as second end 108) and a hitch receiver (such as hitch receiver 114) is coupled to the cross beam (such as cross beam 104). A first hitch frame (such as first hitch frame 120) is rotatably coupled to the first hitch member (such as first hitch member 110), and a second hitch frame (such as second hitch frame 124) is rotatably coupled to the second hitch member (such as second hitch member 112). A first extender (such as first extender 132) is coupled to the first hitch frame (such as first hitch frame 120) and the first hitch member (such as first hitch member 110). A second extender (such as second extender 134) is coupled to the second hitch frame (such as second hitch frame 124) and the second hitch member (such as second hitch member 112) (block 142). A ball mount (such as ball mount 116) is coupled to the hitch receiver (such as hitch receiver 114) (block 144). The first extender (such as first extender 132) and the second extender (such as second extender 134) is activated such that the hitch arm (such as hitch arm 102) rotates away from the first hitch member (such as first hitch member 110) and second hitch member (such as second hitch member 112) (block 146). The hitch receiver (such as hitch receiver 114) is aligned with a trailer coupler (such as trailer coupler 140) (block 148). The first extender (such as first extender 132) and second extender (such as second extender 134) is activated such that the hitch arm (such as hitch arm 102) rotates toward the first hitch member (such as first hitch member 110) and the second hitch member (such as second hitch member 112) (block 150). The ball mount (such as ball mount 116) is coupled to the trailer coupler (such as trailer coupler 140).

Implementations may include one or more of the following. An apparatus may include a hitch arm having a cross beam having first end and a second end. The hitch arm may include a first hitch member adjacently coupled to the first end; and a second hitch member adjacently coupled to the second end. A hitch receiver may be coupled to the cross beam. A first hitch frame may be rotatably coupled to the first hitch member. A second hitch frame may be rotatably coupled to the second hitch member. A first extender may be coupled to the first hitch frame and the first hitch member. A second extender may be coupled to the second hitch frame and the second hitch member.

In one aspect, the first hitch member is coupled to the first hitch frame by a first locking actuator. The second hitch member is coupled to the second hitch frame by a second locking actuator. The hitch arm is comprised of a metal alloy. The hitch receiver comprises a ball mount. The first extender and second extender comprise a pneumatic system. The first extender and second extender comprise a hydraulic system.

Implementations may include one or more of the following. A system may include a mobile vehicle having a vehicle frame. A hitch apparatus may be coupled to the vehicle frame. The hitch apparatus may include a hitch arm having a cross beam having first end and a second end. The hitch arm may include a first hitch member adjacently coupled to the first end; and a second hitch member adjacently coupled to the second end. A hitch receiver may be coupled to the cross beam. A first hitch frame may be rotatably coupled to the first hitch member. A second hitch frame may be rotatably coupled to the second hitch member. A first extender may be coupled to the first hitch frame and the first hitch member. A second extender may be coupled to the second hitch frame and the second hitch member.

In one aspect, the first hitch member is coupled to the first hitch frame by a first locking actuator. The second hitch member is coupled to the second hitch frame by a second locking actuator. The hitch arm is comprised of a metal alloy. The hitch receiver comprises a ball mount. The first extender and second extender comprise a pneumatic system. The first extender and second extender comprise a hydraulic system.

Implementations may include one or more of the following. A method may include coupling a hitch apparatus to a vehicle frame. The hitch apparatus may include a hitch arm having a cross beam having first end and a second end. The hitch arm may include a first hitch member adjacently coupled to the first end; and a second hitch member adjacently coupled to the second end. A hitch receiver may be coupled to the cross beam. A first hitch frame may be rotatably coupled to the first hitch member. A second hitch frame may be rotatably coupled to the second hitch member. A first extender may be coupled to the first hitch frame and the first hitch member. A second extender may be coupled to the second hitch frame and the second hitch member. A ball mount may be coupled to the hitch receiver. The first extender and second extender may be activated such that the hitch arm rotates away from the first hitch member and second hitch member. The hitch receiver may be aligned to the trailer coupler. The first extender and the second extender may be activated such that the hitch arm rotates toward the first hitch member and second hitch member. The ball mount may be coupled to the trailer coupler.

In one aspect, the first hitch member is coupled to the first hitch frame by a first locking actuator. The second hitch member is coupled to the second hitch frame by a second locking actuator. The hitch arm is comprised of a metal alloy. The hitch receiver comprises a ball mount. The first extender and second extender comprise a pneumatic system. The first extender and second extender comprise a hydraulic system.

The operations of the flow diagrams are described with references to the systems/apparatus shown in the block diagrams. However, it should be understood that the operations of the flow diagrams could be performed by embodiments of systems and apparatus other than those discussed with reference to the block diagrams, and embodiments discussed with reference to the systems/apparatus could perform operations different than those discussed with reference to the flow diagrams.

The word "coupled" herein means a direct connection or an indirect connection.

The text above describes one or more specific embodiments of a broader invention. The invention also is carried out in a variety of alternate embodiments and thus is not limited to those described here. The foregoing description of an embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. An apparatus comprising:
   a hitch arm having:
      a cross beam having a first end and a second end;
      a first hitch member adjacently coupled to the first end;
      a second hitch member adjacently coupled to the second end; and
      a hitch receiver coupled to the cross beam;
   a first hitch frame rotatably coupled to the first hitch member;
   a second hitch frame rotatably coupled to the second hitch member;
   a first extender coupled to the first hitch frame and the first hitch member; and
   a second extender coupled to the second hitch frame and the second hitch member;
      wherein the first hitch member is couplable to the first hitch frame by a first locking actuator, and wherein the second hitch member is couplable to the second hitch frame by a second locking actuator.

2. The apparatus of claim 1 wherein the hitch arm is comprised of a metal alloy.

3. The apparatus of claim 1 wherein the hitch receiver comprises a ball mount.

4. The apparatus of claim 1 wherein the first extender and second extender comprise a pneumatic system.

5. The apparatus of claim 1 wherein the first extender and second extender comprise a hydraulic system.

6. A system comprising:
   a mobile vehicle having a vehicle frame;
   a hitch apparatus coupled to the vehicle frame, the hitch apparatus having:
      a hitch arm having:
         a cross beam having a first end and a second end;
         a first hitch member adjacently coupled to the first end;
         a second hitch member adjacently coupled to the second end; and
         a hitch receiver coupled to the cross beam;
      a first hitch frame rotatably coupled to the first hitch member;
      a second hitch frame rotatably coupled to the second hitch member;
      a first extender coupled to the first hitch frame and the first hitch member; and
      a second extender coupled to the second hitch frame and the second hitch member;
         wherein the first hitch member is couplable to the first hitch frame by a first locking actuator; and
         wherein the second hitch member is couplable to the second hitch frame by a second locking actuator.

7. The system of claim 6 wherein the hitch arm is comprised of a metal alloy.

8. The system of claim 6 wherein the hitch receiver comprises a ball mount.

9. The system of claim 6 wherein the first extender and second extender comprise a pneumatic system.

10. The system of claim 6 wherein the first extender and second extender comprise hydraulic system.

11. A method comprising:
    coupling a hitch apparatus to a vehicle frame, the hitch apparatus having:
       a hitch arm having:
          a cross beam having a first end and a second end;
          a first hitch member adjacently coupled to the first end;
          a second hitch member adjacently coupled to the second end; and
          a hitch receiver coupled to the cross beam;
       a first hitch frame rotatably coupled to the first hitch member;
       a second hitch frame rotatably coupled to the second hitch member;
       a first extender coupled to the first hitch frame and the first hitch member; and
       a second extender coupled to the second hitch frame and the second hitch member;
          and wherein the first hitch member is couplable to the first hitch frame by locking actuators; and wherein the second hitch member is couplable to the second hitch frame by locking actuators;
    coupling a ball mount to the hitch receiver;
    activating the first extender and second extender such that the hitch arm rotates away from the first hitch member and second hitch member;
    aligning the hitch receiver to a trailer coupler;
    activating the first extender and second extender such that the hitch arm rotates toward the first hitch member and second hitch member;
    coupling the ball mount to the trailer coupler.

12. The method of claim 11 wherein the first extender and second extender comprise a pneumatic system.

13. The method of claim 11 wherein the first extender and second extender comprise a hydraulic system.

14. The method of claim 11 wherein the hitch apparatus is comprised of a metal alloy.

* * * * *